United States Patent
Lohr et al.

(10) Patent No.: US 8,259,693 B2
(45) Date of Patent: *Sep. 4, 2012

(54) HARQ PROCESS RESTRICTION AND TRANSMISSION OF NON-SCHEDULED CONTROL DATA VIA UPLINK CHANNELS

(75) Inventors: Joachim Lohr, Darmstadt (DE); Hitoshi Iochi, Osaka (JP)

(73) Assignee: Panasonic Corporation, Osaka (JP)

(*) Notice: Subject to any disclaimer, the term of this patent is extended or adjusted under 35 U.S.C. 154(b) by 958 days.

This patent is subject to a terminal disclaimer.

(21) Appl. No.: 12/240,838

(22) Filed: Sep. 29, 2008

(65) Prior Publication Data
US 2009/0034487 A1    Feb. 5, 2009

Related U.S. Application Data

(63) Continuation of application No. 11/490,485, filed on Jul. 21, 2006, now Pat. No. 7,447,504.

(30) Foreign Application Priority Data

Jul. 25, 2005 (EP) ..................................... 05016114

(51) Int. Cl.
  *H04Q 7/24* (2006.01)
  *H04B 7/212* (2006.01)
(52) U.S. Cl. .................... 370/338; 370/336; 370/347
(58) Field of Classification Search .................. 370/329, 370/336, 338, 347, 442, 468
See application file for complete search history.

(56) References Cited

U.S. PATENT DOCUMENTS

| | | |
|---|---|---|
| 6,236,646 B1 | 5/2001 | Beming |
| 6,836,666 B2 | 12/2004 | Gopalakrishnan |
| 6,973,052 B2 | 12/2005 | Wang |
| 6,993,342 B2 | 1/2006 | Kuchibhotla |
| 7,006,466 B2 | 2/2006 | Borst |
| 7,013,143 B2 | 3/2006 | Love |
| 7,054,633 B2 | 5/2006 | Seo |
| 7,089,015 B2 | 8/2006 | Fukui |
| 7,177,275 B2 | 2/2007 | Stanwood |
| 7,321,589 B2 | 1/2008 | Lohr |
| 7,321,780 B2 | 1/2008 | Love |
| 7,356,005 B2 | 4/2008 | Derryberry |
| 7,362,726 B2 | 4/2008 | Petrovic |
| 2002/0172208 A1 | 11/2002 | Malkamaki |

(Continued)

OTHER PUBLICATIONS

European Search Report dated Dec. 22, 2005.

(Continued)

*Primary Examiner* — Andrew Lee
(74) *Attorney, Agent, or Firm* — Dickinson Wright PLLC

(57) ABSTRACT

The present invention relates to a method and mobile terminal for performing a data allocation process for scheduled data, non-scheduled user data and non-scheduled control data obeying restrictions on the resource utilization defined by a scheduling grant and at least one non-scheduled grant. Further, the invention relates to a method for transmitting control signaling from a network entity in a radio access network of a mobile communication system controlling the radio resources of mobile terminals to at least one of said mobile terminal and the network entity in a radio access network. In order to reduce the delays to control signaling implied by a conventional HARQ process restriction mechanism the present invention suggests a new categorization of uplink data into scheduled data, non-scheduled user data and non-scheduled control data and a new HARQ process restriction mechanism disabling certain HARQ processes for non-scheduled user data only.

6 Claims, 10 Drawing Sheets

U.S. PATENT DOCUMENTS

2004/0219917 A1* 11/2004 Love et al. ............... 455/436
2005/0250497 A1 11/2005 Ghosh
2006/0072503 A1 4/2006 Kim
2006/0120404 A1* 6/2006 Sebire et al. ............ 370/469

OTHER PUBLICATIONS

3GPP TS 25.401 v6.1.0, Technical Specification, $3^{rd}$ Generation Partnership Project, Technical Specification Group Radio Access Network, UTRAN Overall Description (Release 6), www.3GPP.com, Jun. 2003, pp.1-44.

3GPP TR25.896 v6.0.0, Technical Specification, $3^{rd}$ Generation Partnership Project, Technical Specification Group Radio Access Network, Feasibility Study for Enhanced Uplink for UTRA FDD (Release 6), www.3GPP.com, Mar. 2004, pp. 1-179.

3GPP TSG RAN WG1#31, Tdoc# R1-03-0284, "Scheduled and Autonomous Mode Operation for the Enhanced Uplink," Tokyo, Japan, Feb. 17-20, 2003, pp. 1-7.

3GPP TS25.309 v6.2.0, Technical Specification, 3rd Generation Partnership Project, Technical Specification Group Radio Access Network, FDD Enhanced Uplink, Overall Description, Stage 2 (Release 6), www.3GPP.com, Mar. 2005, pp. 1-30.

3GPP TS 25.133 v6.2.0, Technical Specification, 3rd Generation Partnership Project, Technical Specification Group Radio Access Network, Requirements for Support of Radio Resource Management (FDD) (Release 6), www.3GPP.com, Jun. 2003, pp. 1-162.

3GPP TS 25.331 v5.5.0, Technical Specification, $3^{rd}$ Generation Partnership Project, Technical Specification Group Radio Access Network, Radio Resource Control (RCC), Protocol Specification (Release 5), www.3GPP.com, Jun. 2003, pp. 1-994.

Sharma, et al., "A Moving towards HSUPA (High Speed Uplink Packet Access): A Complete 3.5 G Wireless System," XP010798540, Samsung India Software Operations, Bangalore, India, Jan. 23, 2005, pp. 174-177.

TSG-RAN WG2 meeting #45, Tdoc# R2-042357, "HSUPA Scheduling and Signalling," Yokohama, Japan, Nov. 15-19, 2004, pp.1-3.

Extended European Search Report dated Dec. 22, 2009.

3GPP TSG RAN WG2 #45, R2-042505, Samsung, "Non-scheduled transmission," Nov. 19, 2004, pp. 1-4.

* cited by examiner

United States Patent US 8,259,693 B2

HARQ PROCESS RESTRICTION AND TRANSMISSION OF NON-SCHEDULED CONTROL DATA VIA UPLINK CHANNELS

This is a continuation application of application Ser. No. 11/490,485 filed Jul. 21, 2006 (pending) which is based on European Application number 05016114.0 filed Jul. 25, 2005.

FIELD OF THE INVENTION

The present invention relates to a method and mobile terminal for performing a data allocation process for scheduled data, non-scheduled user data and non-scheduled control data obeying restrictions on the resource utilization defined by a scheduling grant and at least one non-scheduled grant. Further, the invention relates to a method for transmitting control signaling from a network entity in a radio access network of a mobile communication system controlling the radio resources of mobile terminals to at least one of said mobile terminal and the network entity in a radio access network.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

In the sequel two different architectures will be discussed. They are defined with respect to logical distribution of functions across network elements. In actual network deployment, each architecture may have different physical realizations meaning that two or more network elements may be combined into a single physical node.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101.

Enhanced Uplink Dedicated Channel (E-DCH)

Uplink enhancements for Dedicated Transport Channels (DTCH) were studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-e in the following (see 3GPP TSG RAN WG1, meeting #31, Tdoc R01-030284, "Scheduled and Autonomous Mode Operation for the Enhanced Uplink"). The entities of this new sub-layer, which will be described in more detail in the following sections, may be located in user equipment and Node B. On user equipment side, the MAC-e performs the new task of multiplexing upper layer data (e.g. MAC-d) data into the new enhanced transport channels and operating HARQ protocol transmitting entities.

Further, the MAC-e sub-layer may be terminated in the S-RNC during handover at the UTRAN side. Thus, the reordering buffer for the reordering functionality provided may also reside in the S-RNC.

E-DCH MAC Architecture—UE side

FIG. 3 shows the exemplary overall E-DCH MAC architecture on UE side. A new MAC functional entity, the MAC-e/es, is added to the MAC architecture of Release '99.

The MAC interworking on the UE side is illustrated in FIG. 4. There are M different data flows (MAC-d) carrying data packets from different applications to be transmitted from UE to Node B. These data flows can have different QoS requirements (e.g. delay and error requirements) and may require different configuration of HARQ instances. Each MAC-d flow represents a logical unit to which specific physical channel (e.g. gain factor) and HARQ (e.g. maximum number of retransmissions) attributes can be assigned.

Further, MAC-d multiplexing is supported for an E-DCH, i.e. several logical channels with different priorities may be multiplexed onto the same MAC-d flow. Data of multiple MAC-d flows can be multiplexed in one MAC-e PDU (protocol data unit). In the MAC-e header, the DDI (Data Description Indicator) field identifies logical channel, MAC-d flow and MAC-d PDU size. A mapping table is signaled over RRC, to allow the UE to set DDI values. The N field indicates the number of consecutive MAC-d PDUs corresponding to the same DDI value.

The MAC-e/es entity is depicted in more detail in FIG. 5. The MAC-es/e handles the E-DCH specific functions. The selection of an appropriate transport format for the transmission of data on E-DCH is done in the E-TFC Selection entity, which represents a function entity. The transport format selection is done according to the scheduling information (Relative Grants and Absolute Grants) received from UTRAN via L1, the available transmit power, priorities, e.g. logical channel priorities. The HARQ entity handles the retransmission functionality for the user. One HARQ entity supports multiple HARQ processes. The HARQ entity handles all HARQ related functionalities required. The multiplexing entity is responsible for concatenating multiple MAC-d PDUs into MAC-es PDUs, and to multiplex one or multiple MAC-es PDUs into a single MAC-e PDU, to be transmitted at the next TTI, and as instructed by the E-TFC selection function. It is also responsible for managing and setting the TSN per logical channel for each MAC-es PDU. The MAC-e/es entity receives scheduling information from Node B (network side) via Layer 1 signaling as shown in FIG. 5. Absolute grants are received on E-AGCH (Enhanced Absolute Grant Channel), relative grants are received on the E-RGCH (Enhanced Relative Grant Channel).

E-DCH MAC Architecture—UTRAN side

An exemplary overall UTRAN MAC architecture is shown in FIG. 6. The UTRAN MAC architecture includes a MAC-e entity and a MAC-es entity. For each UE that uses an E-DCH, one MAC-e entity per Node-B and one MAC-es entity in the S-RNC are configured. The MAC-e entity is located in the Node B and controls access to the E-DCH. Further, the MAC-e entity is connected to MAC-es located in the S-RNC.

In FIG. 7 the MAC-e entity in Node B is depicted in more detail. There is one MAC-e entity in Node B for each UE and one E-DCH scheduler function in the Node-B for all UEs. The MAC-e entity and E-DCH scheduler handle HSUPA (High-Speed Uplink Packet Access) specific functions in Node B. The E-DCH scheduling entity manages E-DCH cell resources between UEs. Commonly, scheduling assignments are determined and transmitted based on scheduling requests from the UEs. The De-multiplexing entity in the MAC-e entity provides de-multiplexing of MAC-e PDUs. MAC-es PDUs are then forwarded to the MAC-es entity in the S-RNC.

One HARQ entity is capable of supporting multiple instances (HARQ processes), e.g. employing a stop and wait HARQ protocols. Each HARQ process is assigned a certain amount of the soft buffer memory for combining the bits of the packets from outstanding retransmissions. Furthermore each process is responsible for generating ACKs or NACKs indicating delivery status of E-DCH transmissions. The HARQ entity handles all tasks that are required for the HARQ protocol.

In FIG. 8 the MAC-es entity in the S-RNC is shown. It comprises the reordering buffer which provides in-sequence delivery to RLC and handles the combining of data from different Node Bs in case of soft handover. The combining is referred to as Macro diversity selection combining.

It should be noted that the required soft buffer size depends on the used HARQ scheme, e.g. an HARQ scheme using incremental redundancy (IR) requires more soft buffer than one with chase combining (CC).

MAC-e PDU Format

As indicated in FIGS. 10 and 11, for an E-DCH there exist two MAC sublayers: MAC-e and MAC-es. The MAC-es layer "sits on top" of MAC-e layer and receives PDUs directly from MAC-d layer on UE side. MAC-es SDUs (i.e. MAC-d PDUs) of same size provided by a particular logical channel may be multiplexed to a single MAC-es payload (SDU=Service Data Unit). This multiplexed payload data is preceded by a MAC-es header. The MAC-es header is also referred to as a framing header. The number of PDUs, as well as the DDI value identifying the logical channel, the MAC-d flow and the MAC-es SDU size are included as part of the MAC-e header. Multiple MAC-es PDUs, but only one MAC-e PDU can be transmitted in a TTI.

The field DDI (Data Description Indicator) field comprises a specific DDI value indicating that whether there is more than one MAC-es PDU included in the MAC-e PDU. This header will not be associated with a new MAC-es payload.

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.

Serve order: The order in which users are served, e.g. random order (round robin) or according to channel quality (C/I or throughput based).

Allocation method: The criterion for allocating resources, e.g. same data amount or same power/code/time resources for all queued users per allocation interval.

In 3GPP UMTS R99/R4/R5, the packet scheduler for uplink is distributed between Radio Network Controller (RNC) and user equipment (UE). On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

E-DCH—Node B Controlled Scheduling

Node B controlled scheduling is one of the technical features for E-DCH which may enable more efficient use of the uplink resources in order to provide a higher cell throughput in the uplink and may increase the coverage. The term "Node B controlled scheduling" denotes the possibility for a Node B to control uplink resources, e.g. the E-DPDCH/DPCCH power ratio, which the UE may use for uplink transmissions on the E-DCH within limits set by the S-RNC. Node B controlled scheduling is based on uplink and downlink control signaling together with a set of rules on how the UE should behave with respect to this signaling.

In the downlink, a resource indication (scheduling grant) is required to indicate to the UE the (maximum) amount of uplink resources it may use. When issuing scheduling grants, the Node B may use QoS-related information provided by the S-RNC and from the UE in the scheduling requests to determine the appropriate allocation of resources for servicing the UE at the requested QoS parameters.

For the UMTS E-DCH, there are commonly two different UE scheduling modes defined depending on the type of scheduling grants used. In the following the characteristics of the scheduling grants are described.

Scheduling Grants

Scheduling grants are signaled in the downlink in order to indicate the (maximum) resource the UE may use for uplink transmissions. The grants affect the selection of a suitable transport format (TF) for the transmission on the E-DCH (E-TFC selection). However, they usually do not influence the TFC selection (Transport Format Combination) for legacy dedicated channels.

There are commonly two types of scheduling grants which are used for the Node B controlled scheduling:
  absolute grants (AGs), and
  relative grants (RGs)

The absolute grants provide an absolute limitation of the maximum amount of uplink resources the UE is allowed to use for uplink transmissions. Absolute grants are especially suitable to rapidly change the allocated UL resources.

Relative grants are transmitted every TTI (Transmission Time Interval). They may be used to adapt the allocated uplink resources indicated by absolute grants by granular adjustments: A relative grant indicates the UE to increase or decrease the previously allowed maximum uplink resources by a certain offset (step).

Absolute grants are only signaled from the E-DCH serving cell. Relative grants can be signaled from the serving cell as well as from a non-serving cell. The E-DCH serving cell denotes the entity (e.g. Node B) actively allocating uplink resources to UEs controlled by this serving cell, whereas a non-serving cell can only limit the allocated uplink resources, set by the serving cell. Each UE has only one serving cell.

Absolute grants may be valid for a single UE. An absolute grant valid for a single UE is referred to in the following as a "dedicated grant. Alternatively, an absolute grant may also be valid for a group of or all UEs within a cell. An absolute grant valid for a group of or all UEs will be referred to as a "common grant" in the following. The UE does not distinguish between common and dedicated grants.

Relative grants can be sent from serving cell as well as from a non-serving cell as already mentioned before. A relative grant signaled from the serving cell may indicate one of the three values, "UP", "HOLD" and "DOWN". "UP" respectively "DOWN" indicates the increase/decrease of the previously maximum used uplink resources (maximum power ratio) by one step. Relative grants from a non-serving cell can either signal a "HOLD" or "DOWN" command to the UE. As mentioned before relative grants from non-serving cells can only limit the uplink resources set by the serving cell (overload indicator) but can not increase the resources that can be used by a UE.

UE Scheduling Operation

This sections only outlines the principal scheduling operation, more details on the scheduling procedure is provided in 3GPP TS25.309.

The UE maintains a Serving Grant (SG) which is common to all HARQ process, which indicates the maximum power ratio (E-DPDCH/DPCCH) the UE is allowed for the E-TFC selection. The SG is updated by the scheduling grants signaled from serving/non-serving cells. When the UE receives an absolute grant from the serving cell the SG is set to the power ratio signaled in the absolute grant. The absolute grant can activate/deactivate a single or all HARQ processes. As already mentioned before, an absolute grant can be received on primary or secondary E-RNTI. There are some precedence rules for the usage of primary/secondary absolute grants. A primary absolute grant always affects the SG immediately. Secondary absolute grants only affect the SG if the last primary absolute grant deactivated all HARQ processes, or if the last absolute grant that affected the SG was received with the secondary E-RNTI. When the transmission from primary to secondary E-RNTI is triggered, by deactivating all HARQ processes, the UE updates the Serving Grant with the latest received absolute grant on the secondary E-RNTI. Therefore UE needs to listen to both primary and secondary E-RNTIs.

When no absolute grant is received from the serving cell the UE shall follow the relative grants from the serving cell, which are signaled every TTI. A serving relative Grant is interpreted relative to the UE power ratio in the previous TTI for the same hybrid ARQ process as the transmission, which the relative Grant will affect. FIG. 9 illustrates the timing relation for relative grants. The assumption here is that there are 4 HARQ processes. The relative grant received by the UE, which affects the SG of the first HARQ process, is relative to the first HARQ process of the previous TTI (reference process). Since a synchronous HARQ protocol is adopted for E-DCH the different HARQ processes are served successively.

The UE behavior in accordance to serving E-DCH relative grants is shown in the following:
  When the UE receives an "UP" command from Serving E-DCH RLS
    New SG=Last used power ratio+Delta When the UE receives a "DOWN" command from Serving E-DCH RLS New SG=Last used power ratio−Delta The "UP" and "DOWN" command is relative to the power ratio used for E-DCH transmission in the reference HARQ process. The new Serving Grant (SG) for all HARQ processes, affected by the relative grant, is an increase respectively decrease of the last used power ratio in the reference HARQ process. The "HOLD" command indicates that the SG remains unchanged.

As already mentioned before a Node B from a non-serving RLS is only allowed to send relative grants, which can either indicate a "HOLD" or "DOWN". The "DOWN" command enables non-serving cells to limit the intercell-interference caused by UEs which are in SHO with these non-serving cells. The UE behavior upon reception of non-serving relative grants is as follows:

When the UE receives a "DOWN" from at least one Non-serving E-DCH RLS new SG=Last used power ratio−Delta Relative grants from a non-serving RLS affect always all HARQ processes in the UE. The amount of reduction of the used power ratio might be static or depending on the bit rate, for higher bit rates there might be a larger step size (Delta).

When the UE receives a scheduling grant from the serving RLS and a "DOWN" command from at least one non-serving RL:

new SG=minimum (last used power ratio-delta, received AG/RG from serving RLS)

Rate Request Signaling

In order to enable Node B to schedule efficiently while considering also the QoS requirements of a service mapped on the E-DCH, an UE provides the Node B information on its QoS requirements by means of rate request signaling.

There are two kinds of rate request signaling information on the uplink: the so called "happy bit", which is a flag related to a rate request on the E-DPCCH and the scheduling information (SI), which is commonly sent in-band on the E-DCH.

From a system point of view, the one-bit rate request may be advantageously used by the serving cell to effect small adjustments in the resource allocation for example by means of relative grants. On the contrary, scheduling information may advantageously be employed for making longer term scheduling decisions, which would be reflected in the transmission of an absolute grant. Details on the two rate request signaling methods are provided in the following.

Scheduling Information sent on E-DCH

As mentioned before the scheduling information should provide Node B information on the UE status in order to allow for an efficient scheduling. Scheduling information may be included in the header of a MAC-e PDU. The information is commonly sent periodically to Node B in order to allow the Node B to keep track of the UE status. E.g. the scheduling information comprises following information fields:

Logical channel ID of the highest priority data in the scheduling information

UE buffer occupancy (in Bytes)

Buffer status for the highest priority logical channel with data in buffer

Total buffer status

Power status information

Estimation of the available power ratio versus DPCCH (taking into account HS-DPCCH). UE should not take power of DCHs into account when performing the estimation Identifying the logical channel by the logical channel ID from which the highest priority data originates may enable the Node B to determine the QoS requirements, e.g. the corresponding MAC-d flow power offset, logical channel priority or GBR (Guaranteed Bit Rate) attribute, of this particular logical channel. This in turn enables the Node B to determine the next scheduling grant message required to transmit the data in the UE buffer, which allows for a more precise grant allocation. In addition to the highest priority data buffer status, it may be beneficial for the Node B to have some information on the total buffer status. This information may help in making decisions on the "long-term" resource allocation.

In order for the serving Node B to be able to allocate uplink resources effectively, it needs to know up to what power each UE is able to transmit. This information could be conveyed in the form of a "power headroom" measurement, indicating how much power the UE has left over on top of that what is used for DPCCH transmissions (power status). The power status report could also be used for the triggering of a TTI reconfiguration, e.g. switching between 2 ms and 10 ms TTI and vice versa.

Happy Bit

As already explained above the happy bit denotes a one-bit rate request related flag, which is sent on the E-DPCCH. The "happy bit" indicates whether the respective UE is "happy" or "unhappy" with the current serving grant (SG).

The UE indicates that it is "unhappy", if both of the following criteria are met:

Power status criterion: UE has power available to send at higher data rates (E-TFCs) and Buffer occupancy criterion: Total buffer status would require more than n TTIs with the current Grants (where n is configurable).

Otherwise, the UE indicates that it is "happy" with the current serving grant.

Scheduled and Non-Scheduled Data Transmission

In a common UMTS system, there are two categories (or types) of data transmissions for Enhanced Uplink (utilizing an EDCH), scheduled and non-scheduled transmissions.

For scheduled data transmissions, the UE requires a valid scheduling grant before transmitting data on E-DCH. The usual procedure is that UE sends a rate request to the serving Node B by means of either scheduling information or happy bit. Upon reception of the rate request serving Node B allocates uplink resources by means of scheduling grants, i.e. absolute and relative grants, to the UE.

In case of non-scheduled data transmission, the UE is allowed to send E-DCH data at any time, up to a configured number of bits, without receiving any scheduling command from the Node B. Thus, signaling overhead and scheduling delay may be minimized. The resource for non-scheduled transmission is given by the RRC entity (usually the S-RNC) in terms of a maximum number of bits the UE is allowed include in a MAC-e PDU for transmission in a TTI, and is called non-scheduled grant. A non-scheduled grant is may be defined per MAC-d flow. Consequently, logical channels mapped to a non-scheduled MAC-d flow may only transmit up to the non-scheduled grant configured for the respective MAC-d flow. In order to allow the Node Bs serving a particular UE to take into account the possible rise over thermal (RoT) resulting from the UE due to the transmission of non-scheduled data, the Node B(s) is/are informed on the non-scheduled grants assigned to the UE via NBAP signaling (Node B Application Part signaling) from the UTRAN. The UE receives the non-scheduled grants via RRC signaling. There is a set of rules defining the handling of non-scheduled and scheduled data flows.

The UTRAN may restrict a non-scheduled MAC-d flow to use only a limited number of HARQ processes in case of 2 ms TTI (so called HARQ process restriction). For non-scheduled grants, a Node B has always to reserve the configured resources, i.e. maximum number of bits, in its scheduling decisions.

In order to limit the amount of resources, which may be fairly significant especially for the 2 ms TTI case, the Node B has to permanently reserve for non-scheduled transmissions, the UTRAN (commonly the S-RNC) can disable certain HARQ processes for non-scheduled MAC-d flows. The allocation of HARQ processes for non-scheduled MAC-d flows is configured via RRC signaling.

UTRAN may also reserve some HARQ processes for non-scheduled transmission (i.e. scheduled data cannot be sent using these processes, the processes are considered disabled) in case of 2 ms TTI.

Multiple non-scheduled MAC-d flows may be configured in parallel by the S-RNC and may be multiplexed to a single transport channel for transmission using one of the available HARQ processes. In this case, the UE is commonly allowed to transmit non-scheduled data up to the sum of bits indicated by the corresponding non-scheduled grant, if several MAC-d flows are multiplexed in a TTI.

Scheduled grants will be considered on top of non-scheduled transmissions

Logical channels mapped on a non-scheduled MAC-d flow cannot transmit data using a valid Scheduling Grant.

As can be seen from the rules, the resource allocation from UTRAN side is separated by assigning scheduled and non-scheduled grants to the UEs. Also within the UE the allocation of resources to logical channels is done in accordance to scheduled and non-scheduled grants. Logical channels will be served in the order of their priorities until the non-scheduled grants and scheduled grants are exhausted, or the maximum transmit power is reached.

Transport Channels and E-TFC Selection

In third generation mobile communication systems, data generated at higher layers is commonly transmitted via the air interface using so-called transport channels, which are mapped to different physical channels in the physical layer. Transport channels are services offered by the physical layer to Medium Access Control (MAC) layer for information transfer. The transport channels are primarily divided into two types:

First, common transport channels requiring an explicit identification of the receiving UE. This type of transport channel may for example be used, if the data on the transport channel is intended for a specific UE or a sub-set of all UEs (no UE identification is needed for broadcast transport channels).

Second, dedicated transport channels, where the receiving UE is implicitly identified by the physical channel carrying the transport channel The E-DCH is a dedicated transport channel. The data is transmitted via a transport channel in transport blocks, wherein there is one transport block transmitted in a given time interval, referred to as a transmission time interval (TTI). A transport block is the basic data unit exchanged over transport channels, i.e. between the physical layer and MAC layer. Transport blocks arrive to or are delivered by the physical layer once every TTI. In case of transmissions via the E-DCH a transport block corresponds to a MAC-e PDU.

Enhanced transport format combination (E-TFC) restriction/selection is the procedure in which the UE selects the amount of data to transmit within a transmission time interval (TTI). The aim of the E-TFC selection process is to transmit as many data as possible with the transmit power available to the UE. The E-TFC restriction process considers the amount of transmission power remaining for E-DCH transmissions after transmission of data on DCH channels and HS-DPCCH and eliminates transmission formats due to power limitation. The E-TFC selection procedure, which is responsible for the selection of an appropriate transport format for the transmission of data on E-DCH as described before, is invoked by the HARQ entity in MAC-e/es. The E-TFC restriction procedure, which is described in 3GPP TS 25.133: "Requirements for support of radio resource management (FDD)" in more detail.

For each MAC-d flow multiplexed to a transport channel, radio resource control RRC configures the MAC layer with a HARQ profile and a multiplexing list. The HARQ profile includes the power offset and maximum number of HARQ transmissions to use for a respective MAC-d flow. The multiplexing list identifies for each MAC-d flow, the other MAC-d flows from which data can be multiplexed in a transmission that uses the power offset included in its HARQ profile.

RRC may control the scheduling of uplink data by giving each logical channel a priority (for example between 1 and 8, where 1 is the highest priority and 8 the lowest). E-TFC selection in the UE is commonly done in accordance with the priorities indicated by RRC. Logical channels have absolute priority, i.e. the UE may maximize the transmission of higher priority data.

RRC may further allocate non-scheduled transmission grants to individual MAC-d flows in order to reduce the transmission delays. Each non-scheduled grant is applicable for a specific set of HARQ processes indicated by RRC as already mentioned above. RRC may also restrict the set of HARQ processes for which scheduled grants are applicable.

For each configured MAC-d flow, a given E-TFC can be in any of the following states:
Supported state
Blocked state At each TTI boundary, the UEs with an E-DCH transport channel configured may determine the state of each E-TFC for every MAC-d flow configured based on its required transmit power versus the maximum UE transmit.

Further, at every TTI boundary for which a new transmission is requested by the HARQ entity, i.e. in case of retransmissions no E-TFC selection is performed, the UE may perform the operations described in the following. For an E-DCH in UMTS, the Scheduling Grant provides the E-TFC selection function with the maximum E-DPDCH to DPCCH ratio that the UE is allowed to allocate for the upcoming transmission time interval for scheduled data. Based on the HARQ process ID and the RRC configuration, the UE determines whether to take the scheduled and non-scheduled grants into account for the transmission in the upcoming transmission time interval. If for example a non-scheduled grant is disabled (inactive) for the HARQ process ID used in the upcoming transmission time interval, then this non-scheduled grant is assumed to not exist, i.e. set to zero.

The transmission format and data allocation process done during E-TFC selection may inter alia follow the requirements below:
Only the data from logical channels for which a non-zero grant is available may be considered as available;
The data allocation should maximize the transmission of higher priority data;

The amount of data from MAC-d flows for which non-scheduled grants were configured may not exceed the value of the non-scheduled grant;

The total amount of data from MAC-d flows for which no non-scheduled grants were configured shall not exceed the largest payload that can be transmitted based on the Scheduling Grant and the power offset from the selected HARQ profile; In the case where the HARQ process is inactive, the UE shall not include any such data in the transmission;

Only E-TFCs in supported state shall be considered;

Once an appropriate E-TFC and data allocation are found, the "Multiplexing and TSN Setting" entity generates a MAC-e PDU which is passed to the HARQ process identified by the HARQ process ID for transmission.

The E-TFC selection function shall provide this MAC-e PDU and transmission HARQ profile to the HARQ entity. The HARQ entity shall also be informed of whether the transmission includes Scheduling Information.

Summarizing, in the UMTS system currently discussed by the 3GPP, data transmitted on an E-DCH are categorized in scheduled data and non-scheduled data. As described before, MAC-e control signaling like framing headers or Scheduling Information (SI) needs to be accounted for by the E-TFC selection procedure. Scheduling Information are thereby handled as non-scheduled data for which a valid non-scheduled grant is assumed. The introduction of a HARQ process restriction allows a Node B to only reserve resources for non-scheduled data transmissions for particular HARQ processes. However, the newly introduces HARQ process restriction for non-scheduled data on the other hand creates new problems, as for example Scheduling Information handled as non-scheduled data may only be transmitted in the processes for which the non-scheduled grant is valid. This may imply a significant delay to the signaling of scheduling information resulting in a scheduling delay. Delayed scheduling decisions by the serving Node B will in turn reduce the uplink throughput and thereby degrades the quality of service QoS experienced for the different services, which is especially critical, if certain QoS requirements need to be met by a service.

SUMMARY OF THE INVENTION

The object of the invention is to reduce the delays to control signaling implied by a conventional HARQ process restriction mechanism thereby overcoming the problems described above.

The object is solved by the subject matter of the independent claims. Advantageous embodiments of the invention are subject matters to the dependent claims.

In view of the problems outlined above, it is recognized that the negative impacts implied by the HARQ process restriction mechanism described above will impact all mechanisms requiring the uplink signaling of control data in case these control data is handled as non-scheduled data and subjected to the HARQ process restriction. Therefore the invention does not only propose a specific solution of the object above for the signaling of scheduling information, but a solution of the problem for non-scheduled control data in general. According to one main aspects of the invention, the object is solved by a new categorization of uplink data into scheduled data, non-scheduled user data and non-scheduled control data and by a new definition of the HARQ process restriction mechanism. According to the invention, the restriction of the validity of a non-scheduled grant to a subset of HARQ processes is only allowed for enabling/disabling the transmission of non-scheduled user data in the respective HARQ processes for which the non-scheduled grant is valid. The transmission of non-scheduled control data, for example Scheduling Information or a Framing Header, may not be restricted to a subset of the available HARQ processes, i.e. non-scheduled control data may be transmitted using each of the available HARQ processes as needed. According to another aspect of the invention and in view of the new categorization of uplink data and the new definition of the HARQ process restriction, the invention further proposes a new data allocation process, which multiplexes the different types of uplink data to a transport channel according to the data's category, a scheduling grant and a non-scheduled grant thereby taking into account the settings of the HARQ process restrictions.

According to one advantageous embodiment of the invention, a method for performing a data allocation process for scheduled data, non-scheduled user data and non-scheduled control data obeying restrictions on the resource utilization defined by a scheduling grant and at least one non-scheduled grant is provided.

Generally, a scheduling grant indicates the maximum amount of resources a mobile terminal in a wireless communication system is allowed to utilize for transmitting the scheduled data on an uplink channel within a transmission time interval. Further, a non-scheduled grant indicates the maximum amount of resources a mobile terminal is allowed to utilize for transmitting non-scheduled data on the uplink channel within a transmission time interval.

According to this advantageous embodiment of the invention, a non-scheduled grant is restricted to a subset of a plurality of HARQ processes thereby activating the HARQ processes of the subset for transmitting non-scheduled user data. The restriction deactivates the remaining HARQ processes of the plurality of HARQ process for transmitting non-scheduled user data and does not deactivate the remaining HARQ processes for transmitting non-scheduled control data. In other words, all HARQ processes available may be activated for transmitting non-scheduled control data.

For a next transmission time interval, scheduled data, non-scheduled user data and non-scheduled control data pending for uplink transmission are multiplexed to a packet data unit of a transport channel for transmission on the uplink channel within the next transmission time interval using one of the plurality of HARQ processes. Thereby, the scheduled data, the non-scheduled user data and the non-scheduled control data pending for uplink transmission are multiplexed according to the scheduling grant and the corresponding non-scheduled grant thereby taking into account whether the HARQ process to be used in the next transmission time interval is active for the transmission of non-scheduled user data.

Further, the packet data unit is provided for transmission on the uplink channel in the next transmission time interval to the HARQ process to be used in the next transmission time interval.

In an advantageous variation of this embodiment, the non-scheduled control data pending for transmission is multiplexed to the packet data unit provided to the HARQ process to be used in the next transmission time interval for transmission, even if the HARQ process has been deactivated for transmitting non-scheduled user data.

Another embodiment of the invention provides an alternative method for performing a data allocation process for scheduled data, non-scheduled user data and non-scheduled control data obeying restrictions on the resource utilization defined by a scheduling grant and at least one non-scheduled grant.

According to this alternative embodiment, a non-scheduled grant is defined by the mobile terminal to be valid for a subset of a plurality of HARQ processes. The HARQ processes of the subset are activated for the transmission of non-scheduled user data, while the remaining HARQ processes for which the non-scheduled grant is invalid are deactivated for the transmission of non-scheduled user data.

Further, for a next transmission time interval, scheduled data, non-scheduled user data and non-scheduled control data pending for uplink transmission are multiplexed to a packet data unit of a transport channel for transmission on the uplink channel within the next transmission time interval using one of the plurality of HARQ processes. Thereby the scheduled data, the non-scheduled user data and the non-scheduled control data pending for uplink transmission are multiplexed according to the scheduling grant and the corresponding non-scheduled grant thereby taking into account whether a non-scheduled grant has been defined valid or invalid for the HARQ process to be used in the next transmission time interval.

Next, the packet data unit is provided to the HARQ process to be used in the next transmission time interval for transmission on the uplink channel in the next transmission time interval. The HARQ process to be used in the next transmission time interval is thereby (always) assumed to be activated for the transmission of non-scheduled control data.

In a variation of the embodiment, non-scheduled control data pending for transmission is multiplexed to the packet data unit provided to the HARQ process to be used in the next transmission time interval for transmission, even if the HARQ process is deactivated for a non-scheduled grant.

In a further, alternative variation of this embodiment, non-scheduled control data pending for transmission is multiplexed to the packet data unit provided to the HARQ process to be used in the next transmission time interval for transmission, even if a non-scheduled grant is invalid for the HARQ process.

According to another embodiment of the invention, the non-scheduled control data may fore example comprise data for scheduling related control signaling or data for MAC framing header signaling.

In a further embodiment, it is assumed that a non-scheduling grant is valid for non-scheduled user data and non-scheduled control data. In this case, the non-scheduled grant indicates the maximum amount of resources the mobile terminal is allowed to utilize for transmitting non-scheduled user data and non-scheduled control data.

According to a variation of this embodiment, the non-scheduled control data pending for transmission is multiplexed to the packet data unit provided to the HARQ process to be used in the next transmission time interval, even the non-scheduled grant grants an amount of resources for the transmission of non-scheduled data not sufficient to transmit the non-scheduled control data within the next transmission time interval.

In another embodiment it is assumed that there a separate non-scheduled grants valid for non-scheduled user data and non-scheduled control data. Consequently, a separate non-scheduled grant indicating the maximum amount of resources the mobile terminal is allowed to utilize for the transmission of non-scheduled control data is allocated.

Further, it may be adventurous that the amount of resources indicated by the separate non-scheduled grant is always defined or assumed to be sufficiently large to allow for the transmission of the non-scheduled control data in the HARQ process to be used in the next transmission time interval.

In another embodiment of the invention, control signaling from a network entity controlling the radio resource of the mobile terminal comprising an information element indicating the restriction of a non-scheduled grant to a subset of a plurality of HARQ processes is received by the mobile terminal and the mobile terminal restricts the non-scheduled grant to a subset of a plurality of HARQ processes according to the control signaling.

It may be further desirable that the maximum amount of resources indicated by a non-scheduled grant is indicated by the amount of data the mobile terminal is allowed to utilize for transmitting non-scheduled data on the uplink channel within a transmission time interval.

Moreover, in another embodiment of the invention, the maximum amount of resources indicated by the scheduling grant is indicated by a power ratio between the enhanced dedicated physical data channel E-DPDCH and the dedicated physical control channel DPCCH.

Further, it may be advantageous if a scheduling grant and at least one of a non-scheduled grant is received by the mobile terminal from a radio access network of the mobile communication system or is set by the mobile terminal.

Another embodiment of the invention relates to a mobile terminal for use in a wireless communication system. The mobile terminal may be adapted to perform a data allocation process for scheduled data, non-scheduled user data and non-scheduled control data obeying restrictions on the resource utilization defined by a scheduling grant and at least one non-scheduled grant.

As defined previously, the scheduling grant may indicate the maximum amount of resources the mobile terminal is allowed to utilize for transmitting the scheduled data on an uplink channel within a transmission time interval, while a non-scheduled grant may indicate the maximum amount of resources the mobile terminal is allowed to utilize for transmitting non-scheduled data on the uplink channel within a transmission time interval.

The mobile terminal may comprise a processing means, such as a general purpose processor, Digital Signal Processor, etc., for restricting a non-scheduled grant to a subset of a plurality of HARQ processes thereby activating the HARQ processes of the subset for transmitting non-scheduled user data. The restriction deactivates the remaining HARQ processes of the plurality of HARQ process for transmitting non-scheduled user data and does not deactivate the remaining HARQ processes for transmitting non-scheduled control data.

Further, the mobile terminal may comprise a multiplexer for multiplexing, for a next transmission time interval, scheduled data, non-scheduled user data and non-scheduled control data pending for uplink transmission to a packet data unit of a transport channel for transmission on the uplink channel within the next transmission time interval using one of the plurality of HARQ processes. The multiplexer may be adapted to multiplex the scheduled data, the non-scheduled user data and the non-scheduled control data pending for uplink transmission according to the scheduling grant and the corresponding non-scheduled grant thereby taking into account whether the HARQ process to be used in the next transmission time interval is active for the transmission of non-scheduled user data. The multiplexer may be further adapted to provide the packet data unit for transmission on the uplink channel in the next transmission time interval to the HARQ process to be used in the next transmission time interval.

In another embodiment of the invention the multiplexer is further adapted to multiplex the non-scheduled control data pending for transmission is to the packet data unit provided to the HARQ process to be used in the next transmission time interval for transmission, even if the HARQ process has been deactivated for transmitting non-scheduled user data.

Another embodiment provides a further mobile terminal for use in a wireless communication system adapted to perform a data allocation process for scheduled data, non-scheduled user data and non-scheduled control data obeying restrictions on the resource utilization defined by a scheduling grant and at least one non-scheduled grant.

This mobile terminal may also comprise a processing means for defining a non-scheduled grant to be valid for a subset of a plurality of HARQ processes. The HARQ processes of the subset are activated for the transmission of non-scheduled user data, while the remaining HARQ processes for which the non-scheduled grant is invalid are deactivated for the transmission of non-scheduled user data.

Further the mobile terminal may comprise a multiplexer for multiplexing, for a next transmission time interval, scheduled data, non-scheduled user data and non-scheduled control data pending for uplink transmission to a packet data unit of a transport channel for transmission on the uplink channel within the next transmission time interval using one of the plurality of HARQ processes. The multiplexer may be adapted to multiplex the scheduled data, the non-scheduled user data and the non-scheduled control data pending for uplink transmission according to the scheduling grant and the corresponding non-scheduled grant thereby taking into account whether a non-scheduled grant has been defined valid or invalid for the HARQ process to be used in the next transmission time interval, and to provide the packet data unit to the HARQ process to be used in the next transmission time interval for transmission on the uplink channel in the next transmission time interval.

According to this embodiment, the mobile terminal assumes the HARQ process to be used in the next transmission time interval to be activated for the transmission of non-scheduled control data.

In a variation of this embodiment of the invention, the multiplexer is adapted to multiplex non-scheduled control data pending for transmission to the packet data unit provided to the HARQ process to be used in the next transmission time interval for transmission, even if the HARQ process is deactivated for a non-scheduled grant.

In another variation, the multiplexer is adapted to multiplex non-scheduled control data pending for transmission to the packet data unit provided to the HARQ process to be used in the next transmission time interval for transmission, even if a non-scheduled grant is invalid for the HARQ process.

The mobile terminal according to the embodiments above may further comprise means adapted to perform the steps of method for performing a data allocation process described above.

A further embodiment of the invention provides a computer readable medium storing instructions that, when executed by a processor of a mobile terminal, cause the mobile terminal to perform a data allocation process for scheduled data, non-scheduled user data and non-scheduled control data obeying restrictions on the resource utilization defined by a scheduling grant and at least one non-scheduled grant.

The instructions may cause the mobile terminal to perform the data allocation process by restricting a non-scheduled grant to a subset of a plurality of HARQ processes thereby activating the HARQ processes of the subset for transmitting non-scheduled user data, whereby the restriction deactivates the remaining HARQ processes of the plurality of HARQ processes for transmitting non-scheduled user data and does not deactivate the remaining HARQ processes for transmitting non-scheduled control data, and by multiplexing scheduled data, non-scheduled user data and non-scheduled control data pending for uplink transmission for a next transmission time interval to a packet data unit of a transport channel for transmission on the uplink channel within the next transmission time interval using one of the plurality of HARQ processes. Thereby, the scheduled data, the non-scheduled user data and the non-scheduled control data pending for uplink transmission are multiplexed according to the scheduling grant and the corresponding non-scheduled grant thereby taking into account whether the HARQ process to be used in the next transmission time interval is active for the transmission of non-scheduled user data.

Further, the instructions stored on the computer readable medium may cause the mobile terminal to provide the packet data unit for transmission on the uplink channel in the next transmission time interval to the HARQ process to be used in the next transmission time interval.

In an advantageous variation of the embodiment, the computer readable medium may further store instructions that, when executed by the processor of the mobile terminal, cause the mobile terminal to multiplex the non-scheduled control data pending for transmission to the packet data unit provided to the HARQ process to be used in the next transmission time interval for transmission, even if the HARQ process has been deactivated for transmitting non-scheduled user data.

Another embodiment of the invention relates to a computer readable medium storing instructions that, when executed by a processor of a mobile terminal, cause the mobile terminal to perform a data allocation process for scheduled data, non-scheduled user data and non-scheduled control data obeying restrictions on the resource utilization defined by a scheduling grant and at least one non-scheduled grant.

According to this embodiment the mobile terminal is caused to perform the data allocation process by defining a non-scheduled grant to be valid for a subset of a plurality of HARQ processes, wherein the HARQ processes of the subset are activated for the transmission of non-scheduled user data, while the remaining HARQ processes for which the non-scheduled grant is invalid are deactivated for the transmission of non-scheduled user data, and, for a next transmission time interval, multiplexing scheduled data, non-scheduled user data and non-scheduled control data pending for uplink transmission to a packet data unit of a transport channel for transmission on the uplink channel within the next transmission time interval using one of the plurality of HARQ processes. Thereby, the scheduled data, the non-scheduled user data and the non-scheduled control data pending for uplink transmission are multiplexed according to the scheduling grant and the corresponding non-scheduled grant thereby taking into account whether a non-scheduled grant has been defined valid or invalid for the HARQ process to be used in the next transmission time interval.

Further, the instructions may cause the mobile terminal to provide the packet data unit to the HARQ process to be used in the next transmission time interval for transmission on the uplink channel in the next transmission time interval, wherein the HARQ process to be used in the next transmission time interval is always assumed to be activated for the transmission of non-scheduled control data.

In another embodiment, the computer readable medium may further store instructions that, when executed by the processor of the mobile terminal, cause the mobile terminal to multiplex non-scheduled control data pending for transmission to the packet data unit provided to the HARQ process to be used in the next transmission time interval for transmission, even if the HARQ process is deactivated for a non-scheduled grant.

Alternatively, the medium may also store instructions that, when executed by the processor of the mobile terminal, cause the mobile terminal to multiplex non-scheduled control data pending for transmission to the packet data unit provided to the HARQ process to be used in the next transmission time interval for transmission, even if a non-scheduled grant is invalid for the HARQ process.

The computer readable medium may store instructions that, when performed by the processor of the mobile terminal, cause the mobile terminal to perform the steps of the method for performing a data allocation process according to one of the various embodiments and variations thereof described above.

Another aspect of the invention relates to the operation of a network entity in a radio access network of a mobile communication system controlling the radio resources of mobile terminals. According to this aspect, another embodiment of the invention relates to a method for transmitting control signaling from a network entity in a radio access network of a mobile communication system controlling the radio resources of mobile terminals to at least one of the mobile terminal. The network entity may choose a subset of a plurality of HARQ processes utilized for receiving scheduled user data, non-scheduled user data and non scheduled control data from one of the mobile terminals according to a scheduling grant and at least one non-scheduled grant, wherein the HARQ processes of the chosen subset are to be utilized for the transmission of non-scheduled control data from the one mobile terminal to the radio access network via an uplink channel. Further, it may generate control signaling information indicating the HARQ processes of the subset to be activated for the transmission of non-scheduled control data to the radio access network, and may transmit the control signaling information to the one mobile terminal.

Advantageously, the control signaling information may be comprised within an information element of a signaling message transmitted to the one mobile terminal setting up or reconfiguring the uplink channel.

Further, the signaling information may comprise a sequence of bits, the number of bits in the sequence of bits being equivalent to the number of available HARQ processes, wherein the logical value of a respective one of the bits in the sequence indicates to the one mobile terminal whether a corresponding HARQ process is activated or deactivated for the transmission of non-scheduled control data on the uplink channel.

Another embodiment of the invention relates to a network entity in a radio access network of a mobile communication system controlling the radio resources of mobile terminals. The network entity may comprise processing means for choosing a subset of a plurality of HARQ processes utilized for receiving scheduled user data, non-scheduled user data and non scheduled control data from one of the mobile terminals according to a scheduling grant and at least one non-scheduled grant, wherein the HARQ processes of the chosen subset are to be utilized for the transmission of non-scheduled control data from the one mobile terminal to the radio access network via an uplink channel. Further, the processing means may be adapted to generate control signaling information indicating the HARQ processes of the subset to be activated for the transmission of non-scheduled control data to the radio access network.

The network entity may also comprise a transmitter for transmitting the control signaling information to the one mobile terminal, and a receiver from receiving non-scheduled control data from the one mobile terminal.

In a further embodiment, the network entity may comprise means adapted to perform the steps of the method for performing a data allocation process according to the different embodiments and variations thereof described above.

Another embodiment relates to a computer readable medium storing instructions that, when executed by a processor of a network entity of a radio access network in a mobile communication system controlling the radio resources of mobile terminals, cause the network entity to transmit control signaling from the network entity to at least one of the mobile terminal. The network entity is caused to transmit control signaling by choosing a subset of a plurality of HARQ processes utilized for receiving scheduled user data, non-scheduled user data and non scheduled control data from one of the mobile terminals according to a scheduling grant and at least one non-scheduled grant, wherein the HARQ processes of the chosen subset are to be utilized for the transmission of non-scheduled control data from the one mobile terminal to the radio access network via an uplink channel, generating control signaling information indicating the HARQ processes to of the subset to be activated for the transmission of non-scheduled control data to the radio access network, and transmitting the control signaling information to the one mobile terminal.

The computer readable medium may further store instructions that, when executed by the processor of the network entity, cause the network entity to perform the steps of the method for transmitting control signaling according to the different embodiments described herein.

Moreover, the invention relates to a mobile communication system comprising a mobile terminal and a network entity according to one of the different embodiments of the invention described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
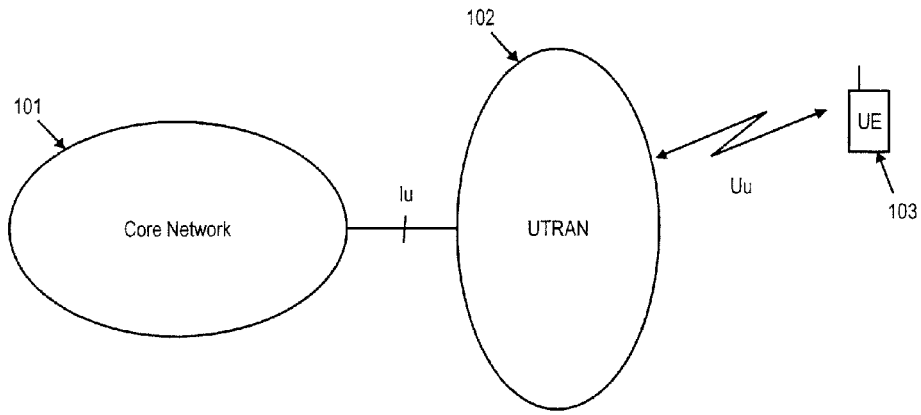
FIG. 1 shows the high-level architecture of UMTS.
Figure 2:
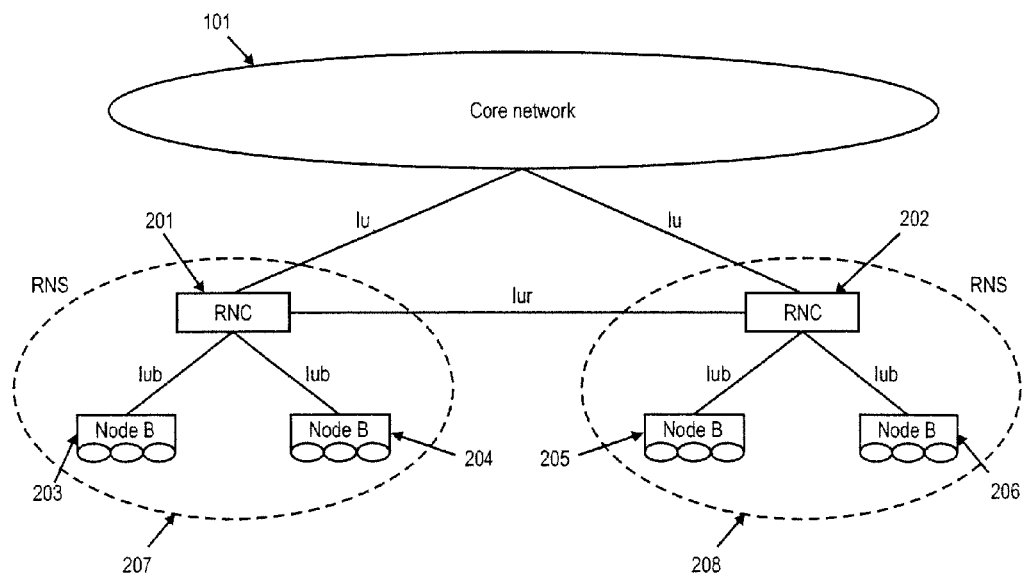
FIG. 2 shows the architecture of the UTRAN according to UMTS R991415.
Figure 3:
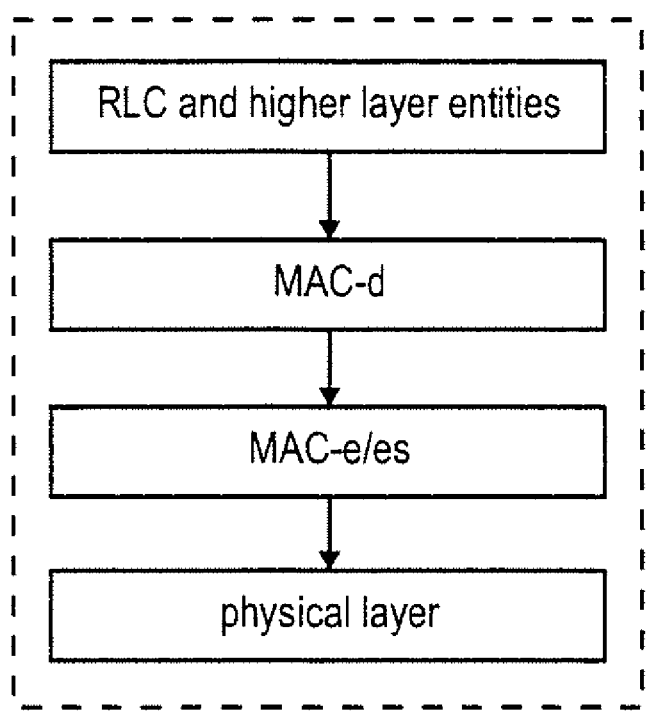
FIG. 3 shows the overall E-DCH MAC architecture at a user equipment.
Figure 4:
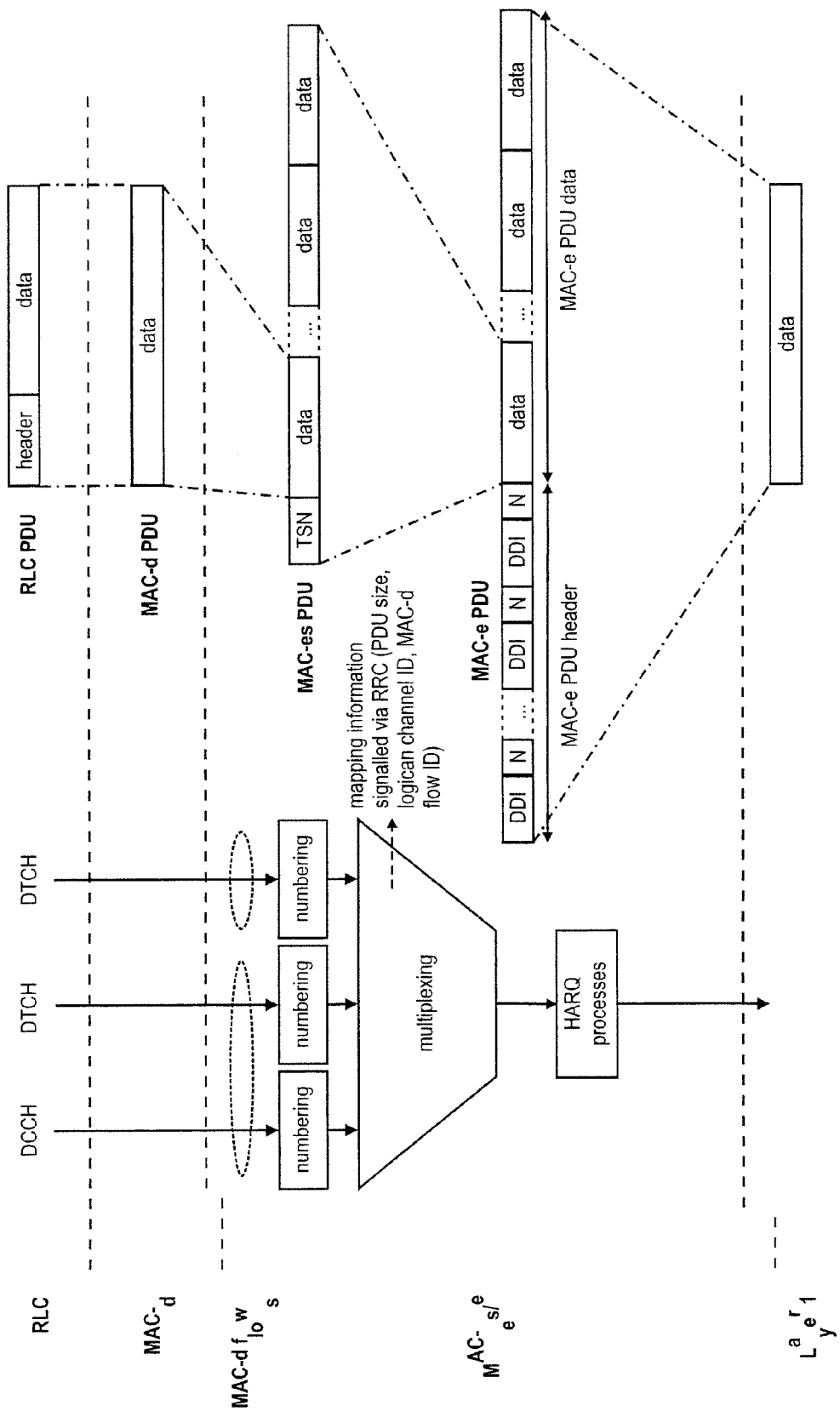
FIG. 4 shows the MAC interworking in a simplified architecture at a user equipment.
Figure 5:
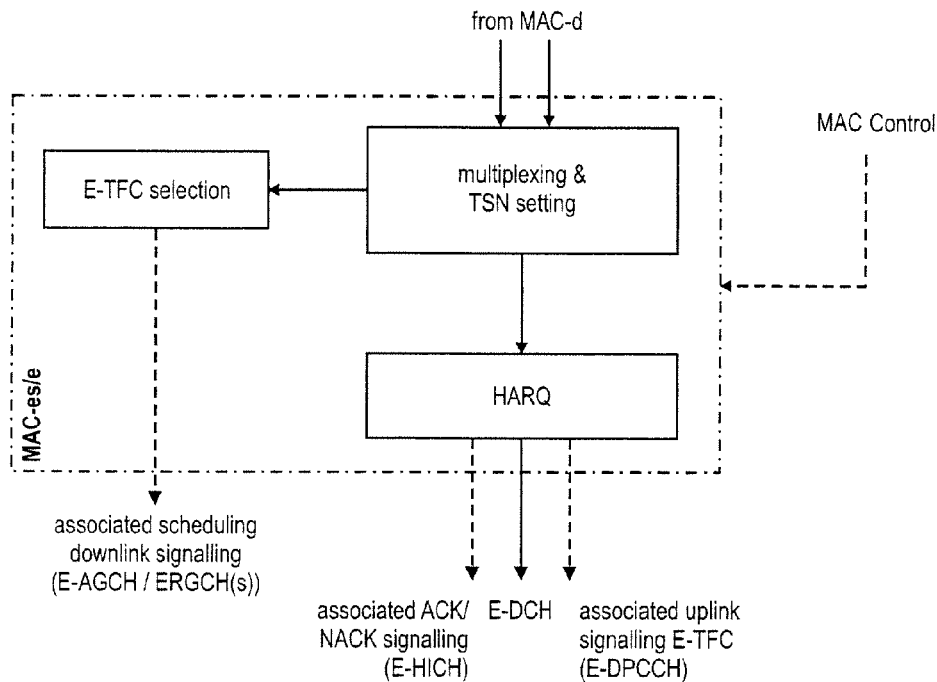
FIG. 5 shows the MAC-e/es architecture at a user equipment.
Figure 7:
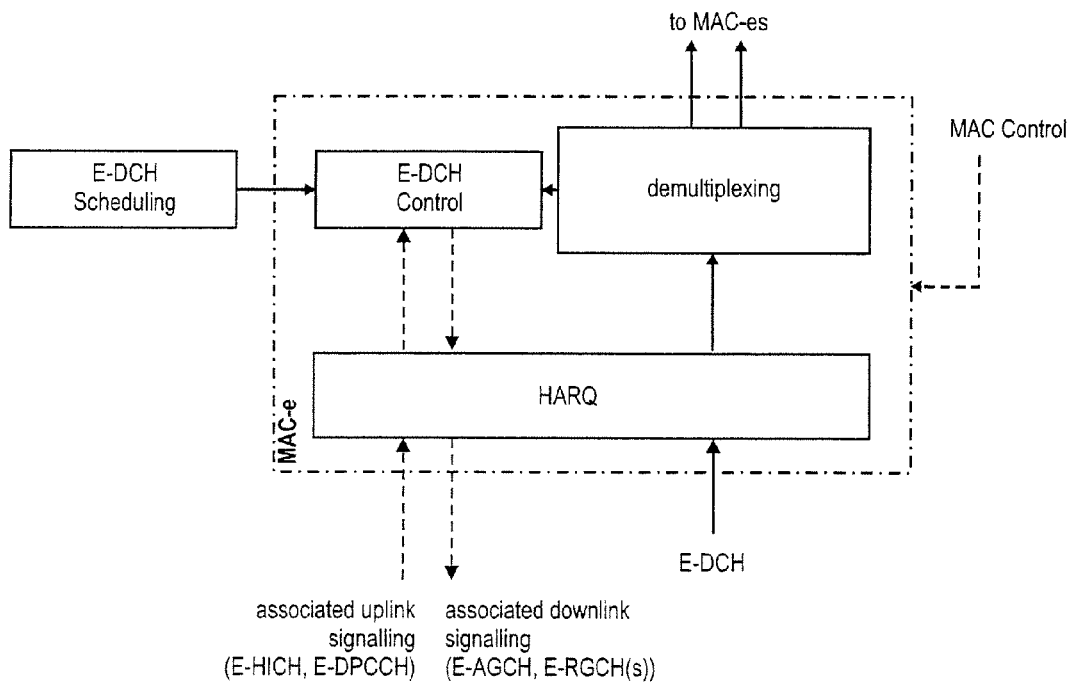
FIG. 7 shows the MAC-e architecture at a Node B.
Figure 6:
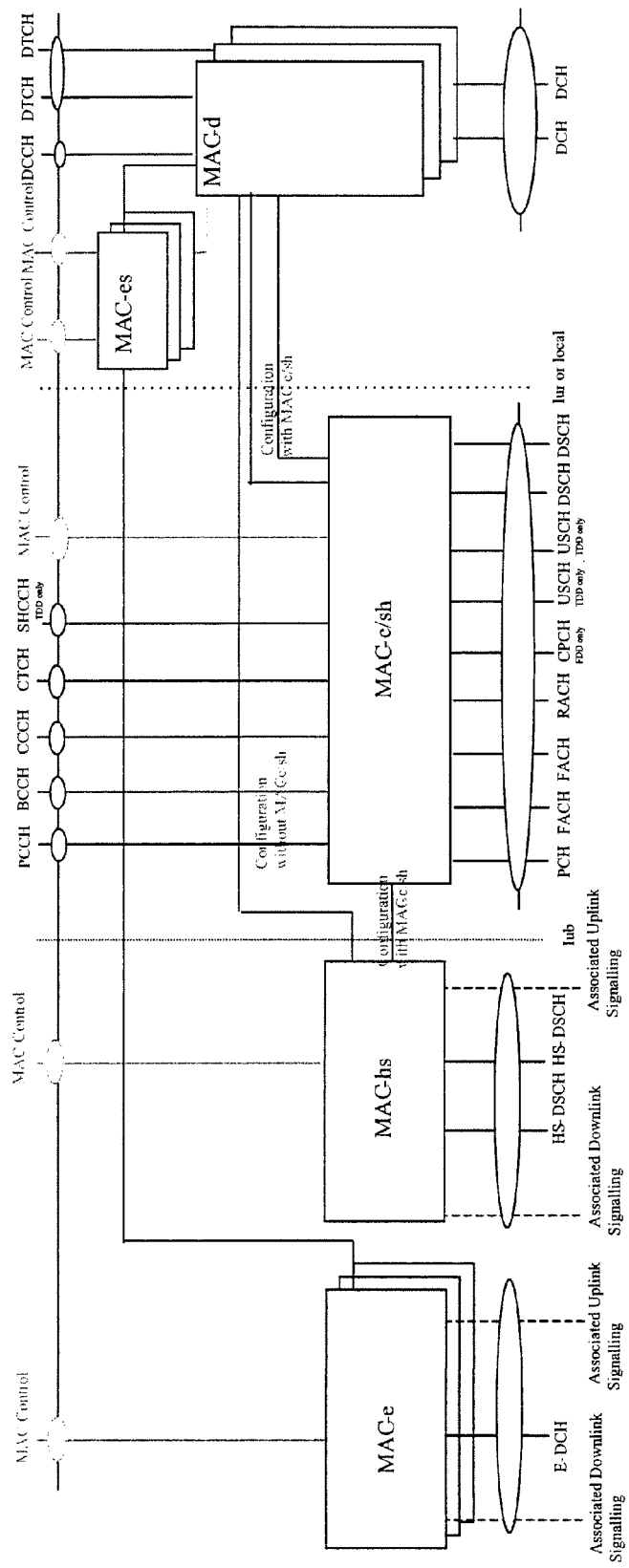
FIG. 6 shows an overall MAC architecture in the UTRAN.
Figure 8:
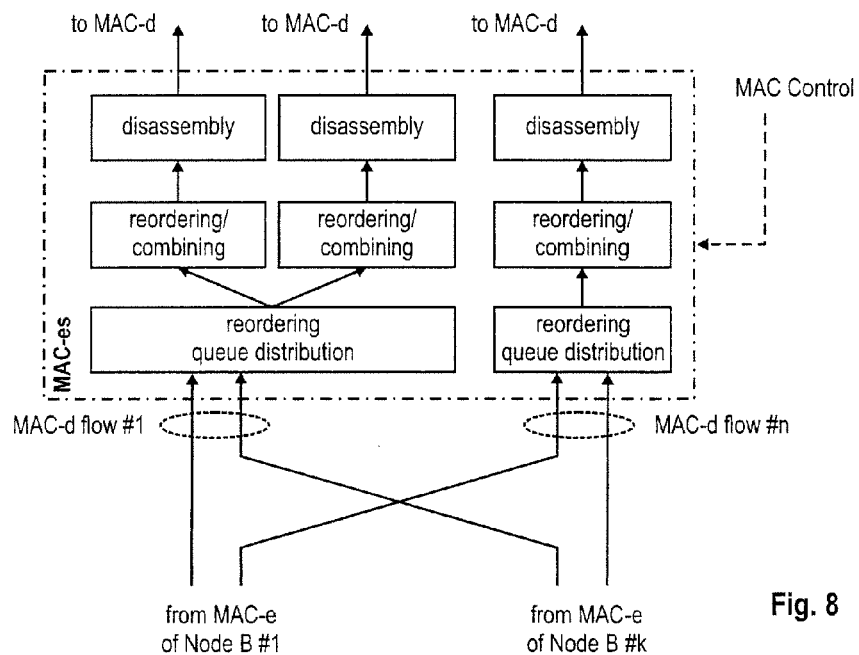
FIG. 8 shows the MAC-es architecture at a S-RNC.

The following paragraphs will describe various embodiments of the invention. For exemplary purposes only, most of the embodiments are outlined in relation to a UMTS communication system and the terminology used in the subsequent sections mainly relates to the UMTS terminology, as the invention may be advantageously used in this type of communication network. However, the used terminology and the description of the embodiments with respect to a UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

The ideas presented herein may also be applied to (mobile) communication systems that operate with the scheduled data/non-scheduled data paradigm and employ similar mechanism for scheduling as outlined herein. Further, the invention is also independent of the transmission time interval configured for different flows of the uplink channel.

As has been indicated previously, one of the main ideas of the invention is the introduction of a new categorization of data transmitted via a dedicated uplink channel, such as an E-DCH. According to the invention, data to be transmitted on the uplink is categorized in three categories: scheduled data, non-scheduled user data and non-scheduled control data.

According to one embodiment of the invention, the scheduled data may for example be any type of payload provided from higher layer user service to the MAC layer entity/entities in a mobile terminal. As can be already derived from the terminology used, scheduled data require an explicit grant of uplink resources for transmission, a so-called scheduling grant. In an exemplary embodiment, the grant of resources may be implemented as suggested in the Technical Background section above. However, also other mechanism of dynamic resource allocation may be used that allocate resources for certain time periods, e.g. on a TTI basis or multiple-TTI basis.

The non-scheduled user data may be user service data that do not require an explicit grant of resources on a transmission time interval basis. As described in the Technical Background section, the non-scheduled user data require a valid so-called non-scheduled grant that grants a given amount of bits for transmission within a transmission time interval. Further, the non-scheduled grants may be valid for individual user data flows, for example individual logical channels or MAC-d flows. The non-scheduled grant(s) may be statically configured at session startup or may be reconfigurable during uplink service provision. The configuration may be signaled to the mobile terminals, for example employing a radio resource control (RRC) protocol, from a network entity in the radio access network (RAN) of a mobile communication network controlling the radio resource utilization of mobile terminals. E.g. in the UTRAN of the UMTS network this signaling function is usually provided by the serving RNC.

The third category of data defined by the invention is so called non-scheduled control data. As for the non-scheduled user data, the non-scheduled control data require a valid non-scheduled grant that grants a given amount of bits for transmission within a transmission time interval. Generally, it may be possible that non-scheduled user data and non-scheduled control data "share" a non-scheduled grant (i.e. the grant is valid for both, non-scheduled user data and non-scheduled control data together) or a non-scheduled grant for non-scheduled control data may be defined separately. If a non-scheduled grant is provided for non-scheduled control data same may be statically or dynamically configured by the mobile terminal with or without using related control signaling from the RAN.

The non-scheduled control data may for example be scheduling information. In one embodiment of the invention, the scheduling information and their provision to the RAN may for example be defined and configured as described in the Technical Background section. In general, scheduling information according to the invention may denote any type of data that indicates to a scheduling Node B (base station) information that allows the Node B to schedule the mobile terminals under its control within its cell(s) so as to adhere to a maximum Rise over Thermal (RoT) caused by the mobile terminals within the cell(s).

Figure 10:
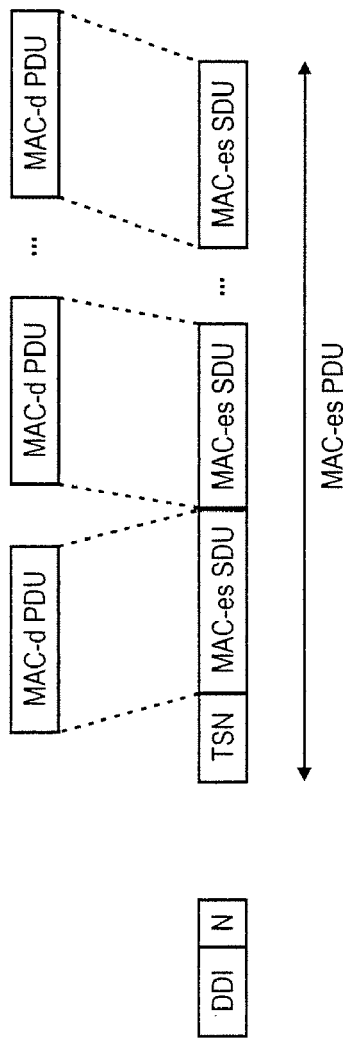
FIG. 10 shows the structure of a MAC-es PDU.

For example, if scheduling is performed on a per logical channel basis, i.e. QoS requirements associated to a logical channel are taken into account by the scheduler, the scheduling information needs to identify the respective logical channel for which the scheduling information is transmitted. Scheduling information may be transmitted by a mobile terminal for the highest priority logical channel(s) only or for all logical channels configured in the mobile terminal. As the transmission of control information contributes to the RoT within the cell, the amount of control signaling tolerable in view of the system efficiency may vary and the amount of non-scheduled control data may be restricted to reporting on individual logical channels and/or to certain events (event triggered reporting) and/or periodic reporting. The scheduling information may further comprise information that allow the scheduling Node B to determine which terminals need to be allocated more/less resources to allow to meet QoS restrictions associated to the logical channels. For example the transmission buffer status for the highest priority logical channel or the total buffer status of the mobile terminal. Moreover, the scheduling information may also indicate power status information. Scheduling Information is not directly coupled with higher layer data. Scheduling Information may be transmitted independent, i.e. without other user or control data, or with non-scheduled user data or scheduled user data, if existing. Another possible type of non-scheduled control data according to another embodiment of the invention is the data of the framing header, as been discussed with respect to FIG. 10. Also for the framing header, which is always coupled with higher layer data, a non-scheduled grant may be assumed by the mobile terminal during E-TFC selection, i.e. in case of non-scheduled control data. Since a framing header is associated to MAC-d PDUs, the mobile terminal (e.g. UE) may assume the same configuration as for the associated MAC-d flow. In case of non-scheduled control data the mobile terminal may assume a non-scheduled grant for the transmission of the framing header and the same HARQ process allocation as configured for the associated MAC-d flow in IE "2 ms non-scheduled transmission grant HARQ process allocation" during E-TFC selection. This exemplary operation according to one embodiment of the invention allows guaranteeing that the framing header is always transmitted together with the associated data handled as scheduled user data. Another possible type of non-scheduled control data is data, which is used for Layer 2 mobility. If the uplink serving cell is selected by the mobile terminal, a non-scheduled control PDU may be transmitted from mobile terminal to Node B in order to notify old and new serving cell about the serving cell selection.

In addition to the new proposed categorization of uplink data, another aspect of the invention is the introduction of a new HARQ process restriction mechanism. According to the invention, a restriction of a non-scheduled grant for non-scheduled user data to a subset of HARQ processes is possible, while there is no HARQ process restriction foreseen for non-scheduled control data. The process restriction proposed by the invention may thus apply only to the transmission of non-scheduled user data but not to the transmission non-scheduled control data. As a result, the mobile terminal may multiplex non-scheduled control data to the protocol data unit (or transport block) of a transport channel for transmission using the HARQ process to be utilized in the next transmission time interval as it arises, which allows avoiding undesirable delays in the transmission of the non-scheduled control data.

According to an exemplary embodiment of the invention, a UMTS system as described in the Technical Background section is assumed. In this exemplary embodiment, the UE behavior for the E-TFC selection with respect to the handling of scheduling information may be specified as follows: If scheduling information needs to be transmitted, the E-TFC selection and data allocation process assumes that a non-scheduled grant is available and that the used HARQ process is active for its transmission. By this definition it may be guaranteed, that UE could use every HARQ process for the transmission of scheduling information.

Figure 12:
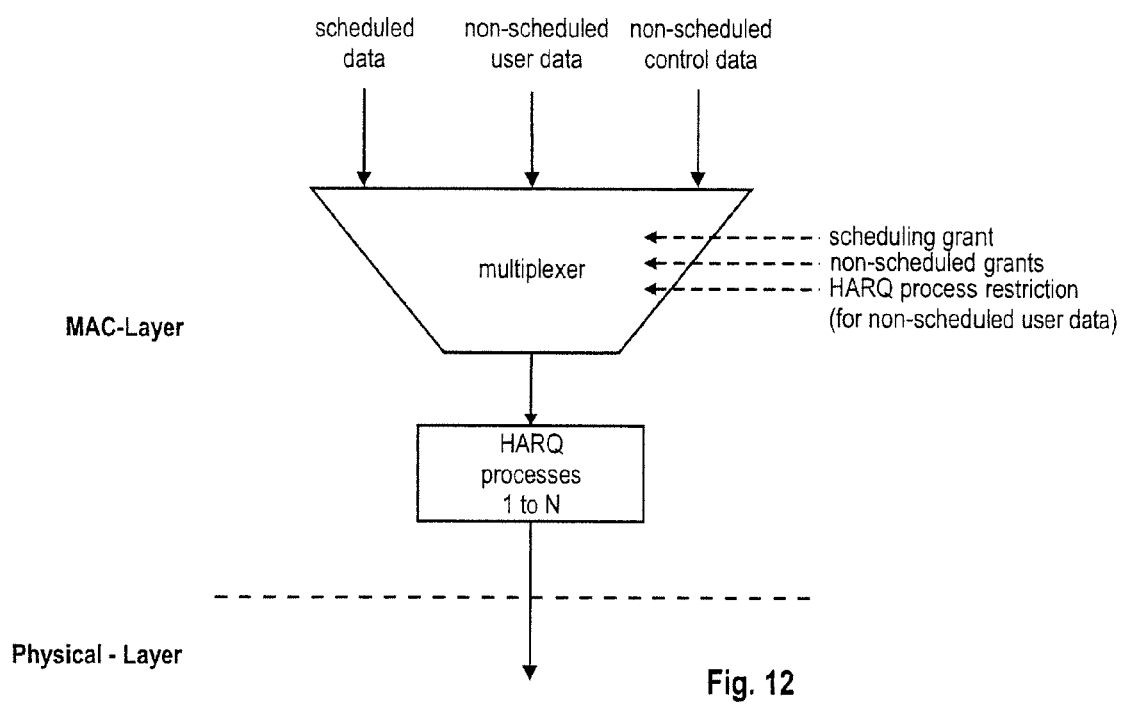
FIG. 12 shows an exemplary structural overview of functional entities of a mobile terminal for executing one embodiment of the invention.
Figure 13:
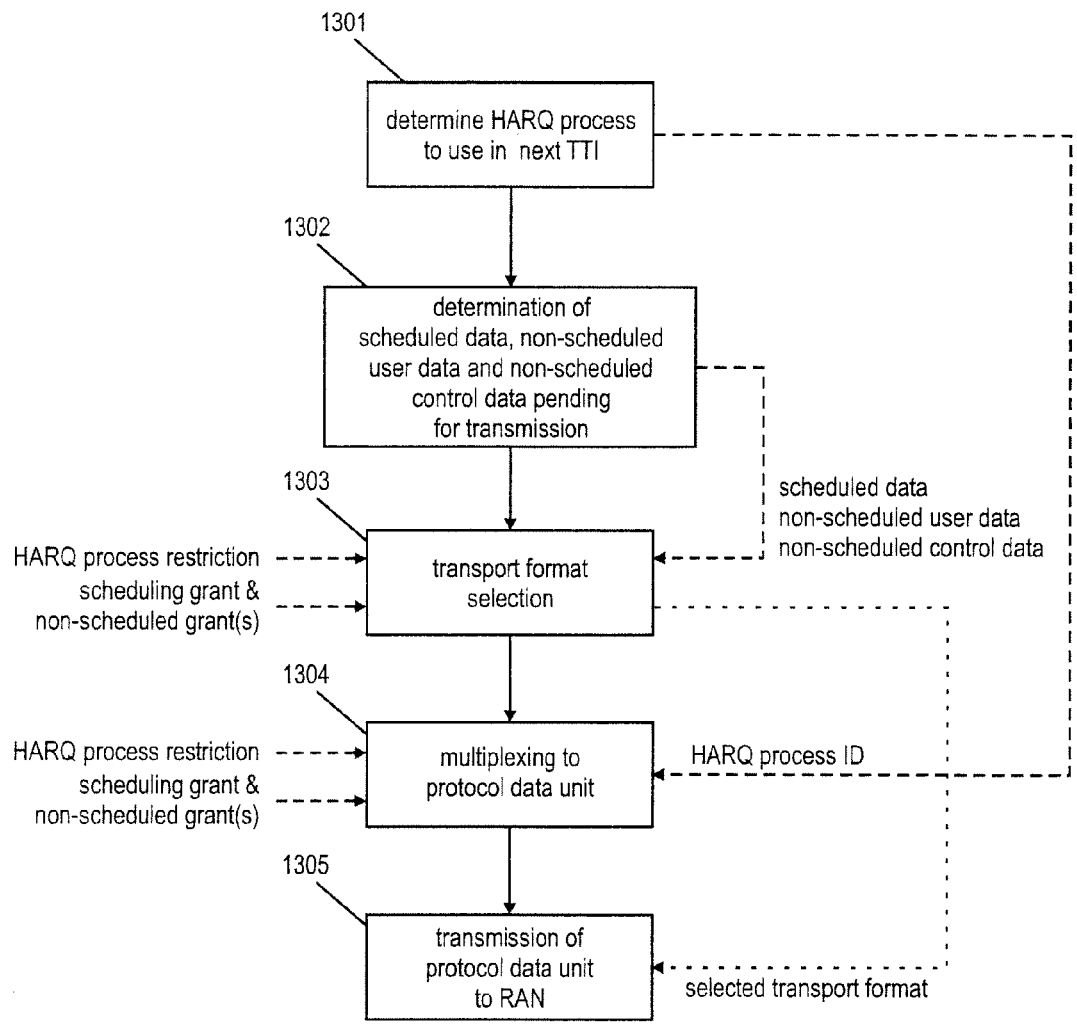
FIG. 13 shows an exemplary flow chart of method steps performed by a mobile terminal according to an embodiment of the invention.
Figure 14:
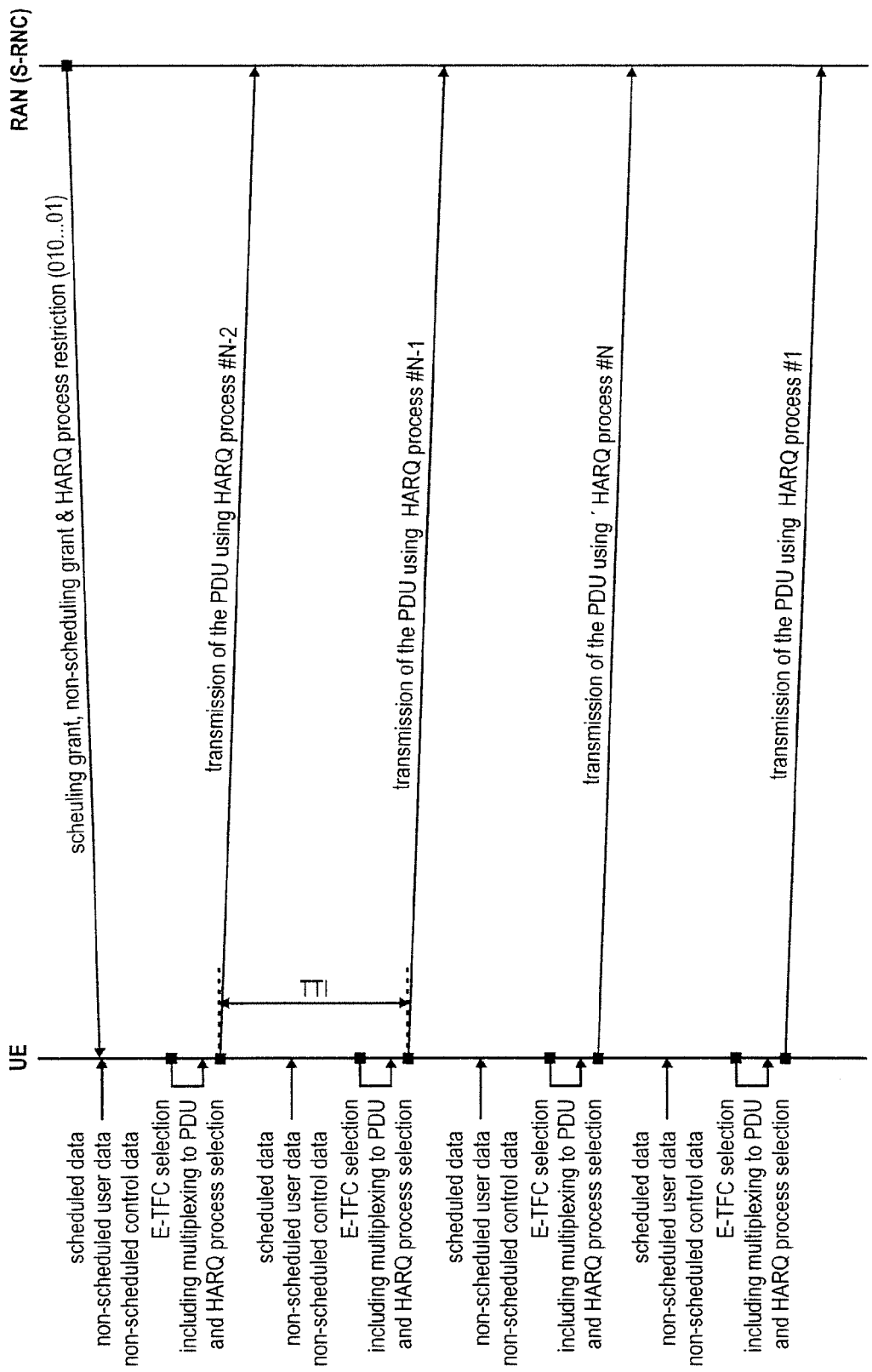
FIG. 14 shows an exemplary flow chart of the operation of a mobile terminal according to a further embodiment of the invention.

Next exemplary embodiment of the invention will be outlined referring to FIG. 12, FIG. 13 and FIG. 14. FIG. 12 shows an exemplary structural overview of functional entities of a mobile terminal according to one embodiment of the invention.

According to this embodiment, scheduled data, non-scheduled user data and non-scheduled control data are provided to a multiplexer. The multiplexer may be a hardware implemented multiplexer or may be implemented by software instructions. Scheduled data, non-scheduled user data as shown in FIG. 12 may be considered as data flows provided from higher layers to a lower layer, as the MAC layer. Also more than one scheduled data flow, non-scheduled user data flow and/or non-scheduled control data flow may be multiplexed by the multiplexer. The data flows may be provided by buffers associated to the respective flows.

For each flow the mobile terminal may have configured an individual grant. A scheduling grant indicating the maximum amount of resources a mobile terminal is allowed to utilize for transmitting scheduled data on an uplink channel within a transmission time interval for all or each of the scheduled data flow(s). Further, a non-scheduled grant indicating the maximum amount of resources a mobile terminal is allowed to utilize for transmitting non-scheduled data on the uplink channel within a transmission time interval is configured. There may be a separate non-scheduled grant for each of or all non-scheduled user data flows provided to the multiplexer. Alternatively, a non-scheduled grant may be assigned to non-scheduled user data and non-scheduled control data. Another possibility is to define a "separate" non-scheduled grant for non-scheduled control data.

The number of bits multiplexed to a protocol data unit to be provided to the RAN in the next transmission time interval may be statically configured in the mobile terminal or may be dynamically controlled.

In an exemplary variation of the embodiment, the selection of the appropriate number of bits from the individual flows for multiplexing may depend on a HARQ process restriction according to the invention, the power offset available to the mobile terminal for transmitting the protocol data unit and the uplink resources allocated to the mobile terminal for the respective flows by the scheduling grant(s) and non-scheduled grant(s).

Figure 9:
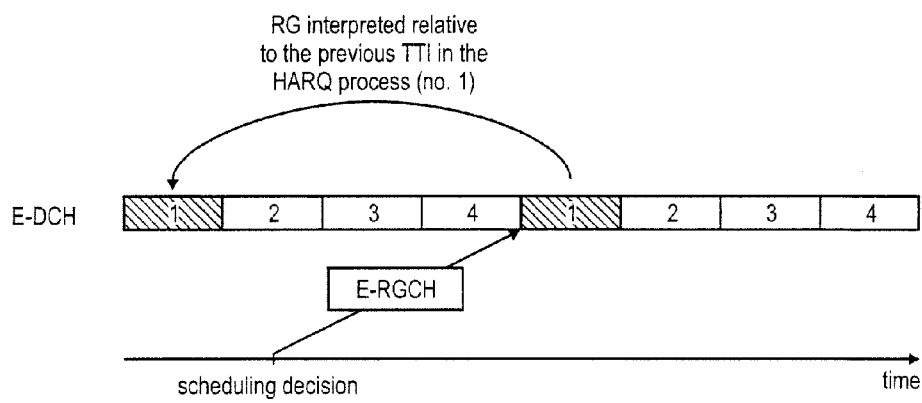
FIG. 9 shows the timing relation of relative grant.

For example, it may be assumed that the available HARQ processes 1 to N are subsequently utilized as has been illustrated in FIG. 9 and as is indicated in FIG. 13. Referring now to FIG. 13 showing an exemplary flow chart of steps performed by a mobile terminal having for example structural entities as shown in FIG. 12, the multiplexer may be provided with or may determine 1301 an ID of the HARQ process to be employed in the next transmission time interval in order to determine whether a process restriction has been configured for this next HARQ process.

Upon having obtained the HARQ process ID, this information is used in step 1302 to determine from which of the flows input to the multiplexer of FIG. 12 data will be transmitted in the next transmission time interval. Obviously, if no data is pending for transmission for a particular flow, no data from the respective flow is multiplexed to the protocol data unit. Further, if the HARQ process identified by the obtained ID is restricted for non-scheduled user data transmission, no data are transmitted from the restricted flow(s) in the next transmission time interval utilizing the restricted HARQ process. It is important to recognize that the restriction of HARQ processes only applies to non-scheduled user data, while the transmission of non-scheduled control data, such as scheduling information, cannot be restricted to individual HARQ processes in this embodiment of the invention.

Upon having determined from which of the different scheduled and non-scheduled data flows information is to be transmitted, the mobile terminal may proceed with selecting 1303 an appropriate transport format combination, for example modulation and coding scheme, spreading code, etc. for the data that may be transmitted within the scheduling grant(s) and non-scheduled grant(s) configured. In an exemplary embodiment of the invention, this selection is performed according to similar rules as the E-TFC selection function discussed previously. If there are non-scheduled control data pending for transmission, the mobile terminal may for example always assume the presence of an associated non-scheduled grant granting sufficient resources on the uplink for the transmission of the non-scheduled control data. If a non-scheduled grant is configured for the transmission of non-scheduled data, this grant may be always configured sufficiently large to allow for the transmission of the non-scheduled control data in each of the HARQ processes.

The selected transport format combination also determines the amount of bits that may be transmitted in the next transmission time interval from the individual data flows. Based on this knowledge, the multiplexer of FIG. 12 may thus proceed and multiplex 14304 the appropriate number of bits from the scheduled and non-scheduled flows to a protocol data unit for transmission. This process may also be referred to as a data allocation process, as by multiplexing certain amounts of bits the available uplink resources are allocated to the individual scheduled and non-scheduled data flows. Again, it is important to recognize that in case non-scheduled control data is pending for transmission, same will be multiplexed to the protocol data unit to be transmitted in the next transmission time interval, independent of any HARQ process restrictions.

Figure 11:
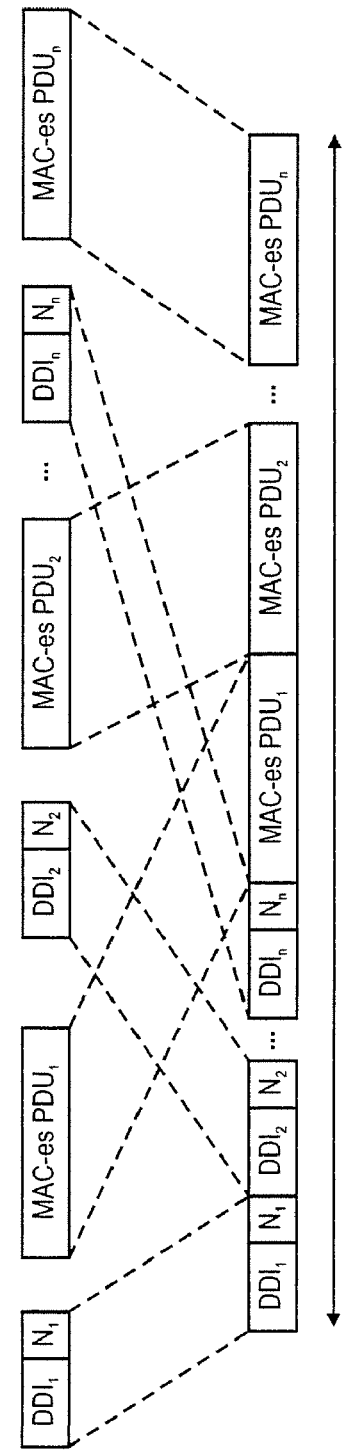
FIG. 11 shows the structure of a MAC-e PDU.

Upon having formed the protocol data unit, which may for example have a configuration as shown in FIG. 11, same is passed to the HARQ processes to be utilized in the next transmission time interval for transmission 1305 using the selected transmission format combination.

FIG. 14 shows an exemplary flow chart of the operation of a mobile terminal according to a further embodiment of the invention. Essentially, the operation of the mobile terminal as outlined with respect to FIG. 12 and FIG. 13 is shown in the time domain. In FIG. 14 it is assumed for exemplary purposes that the mobile terminal (UE) is operated in a UMTS network and data is to be transmitted via an E-DCH. In the figure, the arrow from the RAN to the mobile terminal (UE) intends to illustrate that the scheduling grant is configured by the Node B controlling the respective cell of the mobile terminal, whereas non-scheduling grant(s) may optionally be configured by a network entity of the radio access network controlling the utilization of uplink resources, e.g. the S-RNC, by signaling. For an UMTS network, this signaling between UE and S-RNC may be part of the RRC protocol.

Further, the network entity of the radio access network controlling the utilization of uplink resources may restrict some of the HARQ processes that are utilized for data transmission on an uplink channel in that a subset of the HARQ processes may not be used for the transmission of non-scheduled user data. Optionally, a corresponding restriction may be configured for the transmission of scheduled data. For example, the process restriction may be indicated to the mobile terminal (UE) within an information element of a signaling message as will be outlined further down below in more detail.

According to the illustrative embodiment shown in FIG. 14, the mobile terminal performs an E-TFC selection process every TTI. This E-TFC selection process may be considered a "conventional" TFC selection process, which adopts the new categorization of uplink data in scheduled data, non-scheduled user data and non-scheduled control data and the modifications to the HARQ process restriction mechanism and data allocation process performed using the multiplexer suggested in the different embodiments above.

Another embodiment of the invention deals with the handling of framing headers. In addition to higher-layer data, e.g. RLC PDUs, the new proposed E-TFC selection function may optionally also account for the MAC-e control information, like the MAC-e framing headers. Since the frame headers are associated to higher layer data, it may be assumed that there is always a valid grant available.

There are two possibilities proposed how to account for the framing headers: Either the header will be counted as part of the grant itself or the header shouldn't be counted as part of the grant. For the case of non-scheduled control data the header could be included in the maximum number of bits configured for the corresponding MAC-d flow. On the other hand it might be difficult to account for the header in the grant itself. Bearing in mind, that the framing header overhead is rather small, the header could be also accounted for separately during E-TFC selection (including the data allocation procedure). In this case the mobile terminal may assume a non-scheduled grant for the framing header.

For scheduled data the framing header could be either counted as part of the scheduling grant or the mobile terminal may assume a non-scheduled grant for the header during E-TFC selection. Considering that it's feasible to account for the header in the scheduling grant itself, which would also lead to a more accurate matching of the allocated resources, which seems advantageous.

An alternative to the introduction of a new HARQ process restriction mechanism outlined above, may be a new configuration by the UTRAN. As for example described in section 10.3.6.99 of 3GPP TS 25.331, "Radio Resource Control (RRC); Protocol Specifications (Release 6)", V.6.6.0, the provision of scheduling information may be configured as part of the Physical Channel configuration (IE E-DPDCH Info). In this UMTS related example, UTRAN sends a RADIO BEARER SETUP message to the UE during radio bearer establishment. This message inter alia includes the configuration of transport channels and/or physical channels (like E-DCH and E-DPDCH respectively). Also during the RRC connection setup procedure, UTRAN may provide physical channel parameters like the Information Element IE "E-DPDCH INFO" to the UE, in order to setup the E-DCH connection.

To adapt the system described in section 10.3.6.99 of 3GPP TS 25.331 to the ideas of the invention a HARQ process restriction for the transmission of non-scheduled control data is introduced. In case the non-scheduled control data represents scheduling information, the HARQ process restriction for the transmission of non-scheduled control data may be achieved by the introduction of a new IE entry (information element), which defines the HARQ process allocation for scheduling information. This IE may contain a bit string, each bit representing one of the available HARQ process. Depending on the logical value of the individual bits the corresponding HARQ process is activated or deactivated for the transmission of scheduling information. In order to guarantee that all HARQ processes are active for the transmission of scheduling information the IE is set to 11111111 (assuming the availability of 8 HARQ processes). It may also be possible to explicitly activate/deactivate specific HARQ processes for the transmission of non-scheduled control information, however. In the latter case a tradeoff between a tolerable delay to the transmission of non-scheduled control data has to be determined and the use of HARQ processes for non-scheduled control data transmission has to be restricted accordingly.

An example for a possible information element that defines the HARQ process allocation for scheduling information is shown below:

| IE | Occurence | Type | Comments |
| --- | --- | --- | --- |
| >2ms HARQ process allocation | mandatory (MD) | Bitstring | Scheduling Information is only allowed to be transmitted in those processes for which the bit is set to "1". Bit 0 corresponds to HARQ process 0, bit 1 corresponds to HARQ process 1. Default value is 11111111: transmission in all HARQ processes is allowed. |

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices. In particular it is noted that the processing and categorization of uplink data, the configuration and control of TTI lengths, the multiplexing of the different data types to transport blocks or protocol data units, the configuration and maintenance of grants, the etc. may be accomplished by using hardware in form of computing devices.

Further, the various embodiments of the invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A data transmission method performed by a mobile terminal for transmitting non-scheduled user data and non-scheduled control data using HARQ processes, the method comprising:
    restricting the non-scheduled user data to a subset of a plurality of the HARQ processes for a transmission of the non-scheduled user data,
    wherein the non-scheduled control data can be transmitted using any of the plurality of the HARQ processes, irrespective of the restricting of the non-scheduled user data to the subset of the plurality of the HARQ processes for the transmission of the non-scheduled user data.

2. The data transmission method according to claim 1, further comprising receiving a non-scheduled grant indicating a maximum amount of resources the mobile terminal is allowed to utilize for transmitting the non-scheduled user data on an uplink channel.

3. The data transmission method according to claim 1, wherein the non-scheduled control data is scheduling information for the mobile terminal to request resources.

4. A mobile terminal for transmitting non-scheduled user data and non-scheduled control data using HARQ processes, comprising:
    a restriction section that restricts the non-scheduled user data to a subset of a plurality of the HARQ processes for a transmission of the non-scheduled user data,
    wherein the non-scheduled control data can be transmitted by a transmission section using any of the plurality of HARQ processes, irrespective of the restriction of the non-scheduled user data to the subset of the plurality of the HARQ processes for the transmission of the non-scheduled user data.

5. The mobile terminal according to claim 4, further comprising a reception section that receives a non-scheduled grant indicating a maximum amount of resources the mobile terminal is allowed to utilize for transmitting the non-scheduled user data on an uplink channel.

6. The mobile terminal according to claim 4, wherein the non-scheduled control data is scheduling information for the mobile terminal to request resources.

* * * * *